(12) United States Patent
Hao et al.

(10) Patent No.: US 8,643,646 B2
(45) Date of Patent: Feb. 4, 2014

(54) CONSTRUCTING A CELL-BASED CLUSTER OF DATA RECORDS OF A SCATTER PLOT

(75) Inventors: Ming C. Hao, Palo Alto, CA (US); Umeshwar Dayal, Saratoga, CA (US); Ratnesh Kumar Sharma, Fremont, CA (US); Alex Xin Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1231 days.

(21) Appl. No.: 12/381,716

(22) Filed: Mar. 16, 2009

(65) Prior Publication Data

US 2010/0231594 A1    Sep. 16, 2010

(51) Int. Cl.
*G06T 11/20* (2006.01)
*G06T 15/00* (2011.01)
*G01V 1/34* (2006.01)
*G06F 17/30* (2006.01)

(52) U.S. Cl.
CPC .............. *G06T 11/206* (2013.01); *G01V 1/345* (2013.01); *G06F 17/30958* (2013.01)
USPC ......... 345/440; 345/440.2; 345/419; 345/443

(58) Field of Classification Search
CPC . G06T 11/206; G01V 1/345; G06F 17/30958
USPC ................................ 345/440, 440.2, 419, 443
See application file for complete search history.

(56) References Cited

U.S. PATENT DOCUMENTS

| | | | |
|---|---|---|---|
| 3,487,308 A | 12/1969 | Johnson |
| 5,581,797 A | 12/1996 | Baker |
| 5,608,904 A | 3/1997 | Chaudhuri et al. |
| 5,623,590 A | 4/1997 | Becker et al. |
| 5,623,598 A | 4/1997 | Voigt et al. |
| 5,634,133 A | 5/1997 | Kelley |
| 5,659,768 A | 8/1997 | Forbes et al. |
| 5,694,591 A | 12/1997 | Du et al. |
| 5,757,356 A | 5/1998 | Takasaki et al. |
| 5,801,688 A | 9/1998 | Mead et al. |
| 5,878,206 A | 3/1999 | Chen et al. |
| 5,903,891 A | 5/1999 | Chen et al. |

(Continued)

FOREIGN PATENT DOCUMENTS

EP    0778001    11/1996

OTHER PUBLICATIONS

U.S. Appl. No. 12/321,621, Non-Final Rejection dated Aug. 25, 2011, pp. 1-12 and attachment.

(Continued)

*Primary Examiner* — Javid A Amini

(57) ABSTRACT

To construct at least one cluster of data records of a scatter plot, cells representing the data records are placed in a visualization screen according to values of a first attribute and a second attribute of the data records. Visual indicators are assigned to the cells according to values of a third attribute of the data records. In response to detecting data records having a particular pair of first attribute and second attribute values, cells representing the data records having the particular pair of first attribute and second attribute values are placed in nearby positions according to similarity of values of the third attribute to form the at least one cluster of cells having similar visual indicators.

17 Claims, 8 Drawing Sheets
(6 of 8 Drawing Sheet(s) Filed in Color)

(56) References Cited

U.S. PATENT DOCUMENTS

| | | | |
|---|---|---|---|
| 5,924,103 A | 7/1999 | Ahmed et al. | |
| 5,929,863 A | 7/1999 | Tabei et al. | |
| 5,940,839 A | 8/1999 | Chen et al. | |
| 5,953,006 A * | 9/1999 | Baker et al. | 715/700 |
| 5,986,673 A | 11/1999 | Martz | |
| 5,999,192 A * | 12/1999 | Selfridge et al. | 345/440 |
| 5,999,193 A | 12/1999 | Conley, Jr. et al. | |
| 6,052,890 A | 4/2000 | Malagrino, Jr. et al. | |
| 6,144,379 A | 11/2000 | Bertram et al. | |
| 6,188,403 B1 | 2/2001 | Sacerdoti | |
| 6,211,880 B1 | 4/2001 | Impink, Jr. | |
| 6,211,887 B1 | 4/2001 | Meier et al. | |
| 6,269,325 B1 | 7/2001 | Lee et al. | |
| 6,373,483 B1 | 4/2002 | Becker | |
| 6,384,847 B1 | 5/2002 | Rabenhorst | |
| 6,400,366 B1 | 6/2002 | Davies et al. | |
| 6,429,868 B1 | 8/2002 | Dehner, Jr. et al. | |
| 6,466,946 B1 | 10/2002 | Mishra et al. | |
| 6,502,091 B1 | 12/2002 | Chundi et al. | |
| 6,584,433 B1 | 6/2003 | Zhang et al. | |
| 6,590,577 B1 | 7/2003 | Yonts | |
| 6,603,477 B1 | 8/2003 | Tittle | |
| 6,658,358 B2 | 12/2003 | Hao et al. | |
| 6,684,206 B2 | 1/2004 | Chen et al. | |
| 6,727,926 B1 | 4/2004 | Utsuki et al. | |
| 6,934,578 B2 | 8/2005 | Ramseth | |
| 7,020,869 B2 | 3/2006 | Abari et al. | |
| 7,038,680 B2 | 5/2006 | Pitkow | |
| 7,202,868 B2 | 4/2007 | Hao | |
| 7,221,474 B2 | 5/2007 | Hao et al. | |
| 7,313,533 B2 | 12/2007 | Chang et al. | |
| 7,567,250 B2 | 7/2009 | Hao et al. | |
| 7,714,876 B1 * | 5/2010 | Hao et al. | 345/619 |
| 7,716,227 B1 * | 5/2010 | Hao et al. | 707/748 |
| 7,800,613 B2 | 9/2010 | Hanrahan | |
| 7,844,926 B1 | 11/2010 | Russell | |
| 7,921,363 B1 * | 4/2011 | Hao et al. | 715/273 |
| 7,924,283 B1 | 4/2011 | Hao | |
| 7,940,271 B2 | 5/2011 | Wright | |
| 2002/0118193 A1 | 8/2002 | Halstead, Jr. | |
| 2003/0065546 A1 | 4/2003 | Goruer et al. | |
| 2003/0071815 A1 | 4/2003 | Hao et al. | |
| 2003/0128212 A1 | 7/2003 | Pitkow | |
| 2003/0221005 A1 | 11/2003 | Betge-Brezetz et al. | |
| 2004/0051721 A1 | 3/2004 | Ramseth | |
| 2004/0054294 A1 | 3/2004 | Ramseth | |
| 2004/0054295 A1 | 3/2004 | Ramseth | |
| 2004/0095349 A1 | 5/2004 | Bito | |
| 2004/0183799 A1 | 9/2004 | Hao | |
| 2004/0201588 A1 | 10/2004 | Meanor | |
| 2004/0210540 A1 | 10/2004 | Israel et al. | |
| 2005/0066026 A1 | 3/2005 | Chen et al. | |
| 2005/0119932 A1 | 6/2005 | Hao | |
| 2005/0219262 A1 | 10/2005 | Hao et al. | |
| 2006/0028471 A1 * | 2/2006 | Kincaid et al. | 345/440 |
| 2006/0095858 A1 | 5/2006 | Hao et al. | |
| 2006/0221077 A1 | 10/2006 | Wright | |
| 2007/0040094 A1 * | 2/2007 | Smith et al. | 250/202 |
| 2007/0225986 A1 | 9/2007 | Bowe, Jr. et al. | |
| 2008/0007555 A1 * | 1/2008 | Vrba et al. | 345/440 |
| 2008/0033790 A1 | 2/2008 | Nickerson | |
| 2009/0033664 A1 | 2/2009 | Hao et al. | |
| 2010/0103176 A1 | 4/2010 | Hao | |
| 2010/0182320 A1 | 7/2010 | Cartan | |
| 2010/0188413 A1 | 7/2010 | Hao | |

OTHER PUBLICATIONS

U.S. Appl. No. 12/321,621, Non-Final Rejection dated Feb. 10, 2012, pp. 1-15 and attachments.

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 252212002; pp. 240-250.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

Daniel A. Keim et al., "VisDB: Database Exploration Using Multidimensional Visualization," IEEE Graphics and Applications, vol. 14, No. 5, pp. 40-49 (1994).

Matthew O. Ward, "XmdvTool: Integrating Multiple Methods for Visualizing Multivariate Data," Proc. Visualization, pp. 326-331 (Oct. 1994).

H. Hochheiser et al., "Dynamic Query Tools for Time Series Data Sets: Timebox Widgets for Interactive Exploration," Information Visualization, vol. 3, pp. 1-18 2004.

P. Buono et al., "Technical Research Report, Interactive Pattern Search in Time Series," Institute for Systems Research, TR 2005-57, pp. 1-11 2004.

J. Yang et al., "Visual Hierarchical Dimension Reduction for Exploration of High Dimensional Datasets," Joint Eurographics/IEEE TCVG Symposium on Visualization, pp. 19-28 (May 2003).

J. Fekete et al., "Interactive Information Visualization of a Million Items," Information Visualization, 2002, INFOVIS 2003, IEEE Symposium, Published Oct. 2002, pp. 1-8.

M. Trutschl et al., "Intelligently Resolving Point Occlusion," Information Visualization, 2003, INFOVIS 2003, IEEE Symposium, Published Oct. 2003, Abstract only.

T. Buring et al., "User Interaction with Scatterplots on Small Screens—A Comparative Evaluation of Geometric-Semantic Zoom and Fisheye Distortion," Visualization and Computer Graphics, IEEE Transactions, Published Sep.-Oct. 2006, pp. 1-8.

* cited by examiner

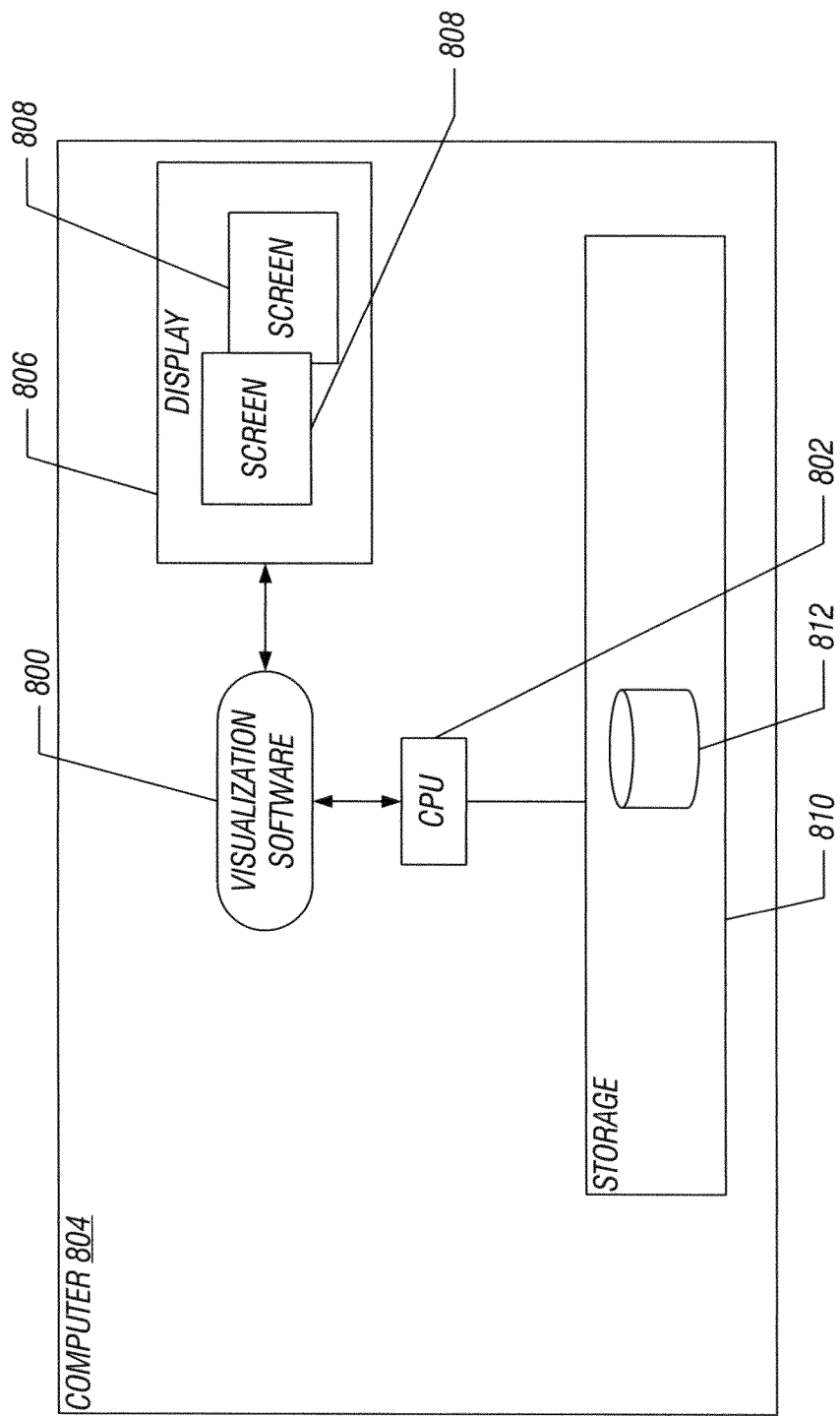

CONSTRUCTING A CELL-BASED CLUSTER OF DATA RECORDS OF A SCATTER PLOT

BACKGROUND

Traditional scatter plots have been widely used to display correlation or association between two variables (or attributes). A scatter plot is a chart that uses Cartesian coordinates (e.g., x-axis or y-axis coordinates) to display values for the two variables. The data displayed in the scatter plot is a collection of points, each having one coordinate on the horizontal axis and one on the vertical axis. An example of a traditional scatter plot is depicted in FIG. 1, where the horizontal axis variable represented in the example of FIG. 1 is a first temperature (T1) from a first temperature sensor (e.g., for monitoring temperature in a first portion of a system), and the vertical axis corresponds to a second temperature (T2) from a second temperature sensor (e.g., for monitoring temperature in a second portion of the system). In the example of FIG. 1, each point in the scatter plot represents a data record that contains a particular pair of T1 and T2 values (which represent coordinates in the scatter plot).

Various points correlating the T1 and T2 values are plotted in the scatter plot of FIG. 1. In FIG. 1, most of the points are clumped together in a relatively dense region 100. The points that are clumped together in the dense region 100 which have the same coordinate values for T1 and T2 lay on top of each other, which results in occlusion of such points. Occlusion prevents a user from seeing the true number of points in dense regions of the scatter plot. Effectively, a traditional scatter plot can show just a relatively small number of distinct data points, even though there may be a much larger number of data points that the viewer cannot see as a result of occlusion (due to overlay of data points). Such occlusion of data points can hide the true extent of the relationship between different variables in a traditional scatter plot.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures:

FIG. 8 is a block diagram of an exemplary computer including visualization software to provide visualization screens according to some embodiments.

DETAILED DESCRIPTION

In accordance with some embodiments, a visualization technique or mechanism is provided to allow for construction of cell-based clusters of cells representing data records of a scatter plot without overlapping of data records. The visualization technique or mechanism provides a visualization screen that has rows and columns containing bins, where each bin includes cells representing respective data records of the scatter plot. A "bin" in the visualization screen refers to a visible partition in the visualization screen that has a first size along the first dimension (e.g., x axis) and a second size along the second dimension (e.g., y axis), where the first and second sizes are dynamically determined based on the data records to be visualized in the visualization screen. The bins can generally be rectangular shaped, such that each bin has a width and a height. The size of each bin is dynamically determined according to the value ranges of the first and second attributes of the received data records. A bin contains data records having coordinates within predefined ranges. Value ranges of the first and second attributes along the horizontal and vertical dimensions (or axes) of the visualization screen define corresponding bins.

The cells representing the data records are placed in the visualization screen according to values of a first attribute and second attribute of respective data records. In addition, visual indicators (e.g., different colors, different gray scale indicators, different hatching patterns, and so forth) are assigned to the cells according to values of a third attribute of the data records. In response to detecting data records having a particular pair of first attribute and second attribute values (in other words, the data records have common first and second attribute values), which may result in overlay of the cells corresponding to data records since they would be placed in the same positions in the visualization screen, the technique or mechanism according to some embodiments places the cells representing the data records having the particular pair of first attribute and second attribute values in nearby positions according to similarity of values of the third attribute to form a cluster of cells having similar visual indicators (e.g., similar colors). By clustering cells without overlay, correlations among attributes can be more easily determined.

Figure 2:
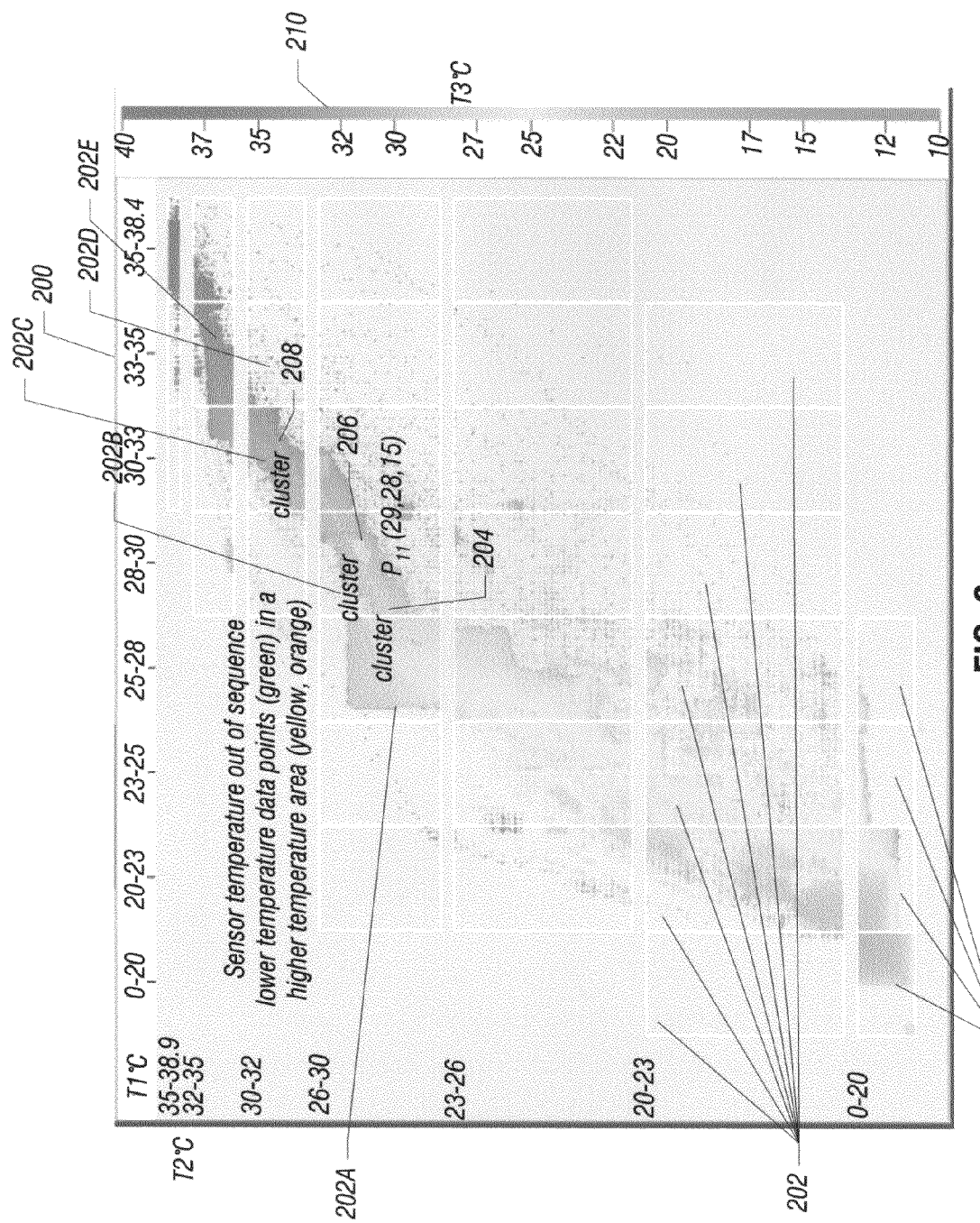
FIG. 2 displays the same data set as FIG. 1, and illustrates a visualization screen that has bins containing cells representing respective data records of a scatter plot, where clusters of cells are depicted, in accordance with an embodiment.

FIG. 2 shows an exemplary visualization screen 200 that has a horizontal dimension (or axis) and a vertical dimension (or axis), where the horizontal dimension represents ranges of values of a first attribute (T1 in the example of FIG. 2), and the vertical dimension represents ranges of values of a second attribute (T2). The attributes T1 and T2 represent temperatures from different temperature sensors (T1 temperature sensor and T2 temperature sensor, such as sensors in a data center rack or other equipment). These temperature sensors can be deployed in a system to monitor temperatures in different portions of a system, such as a data center that includes computer servers, storage devices, communications devices, or other types of devices.

In addition, values of a third attribute (T3) are also depicted in FIG. 2 by color assigned to respective cells based on corresponding T3 values. The attribute T3 represents the temperature from another temperature sensor, a T3 temperature sensor. Note that in the example above, the third attribute is different from the first and second attributes. Alternatively, the third attribute can be the same as the first attribute or third attribute. Instead of assigning color to cells according to T3 values, other types of different visual indicators can be assigned to the cells according to T3 values.

Figure 1:
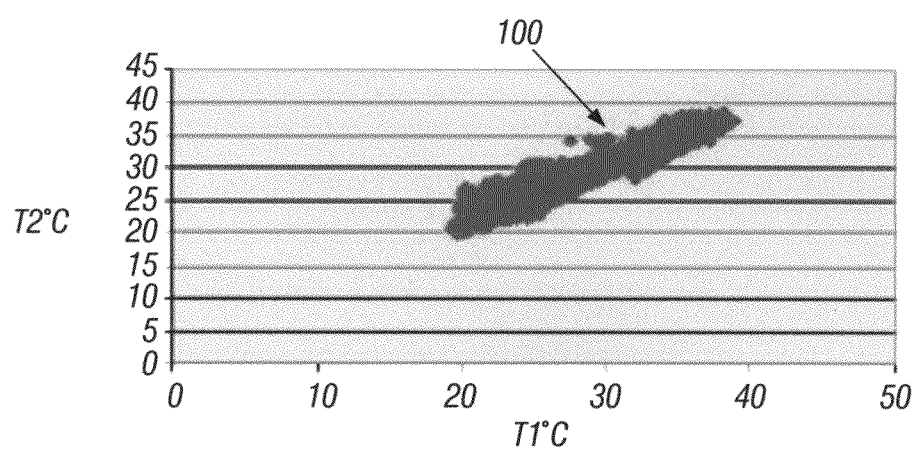
FIG. 1 illustrates a conventional scatter plot that depicts the relationship between two attributes.

The visualization screen 200 is divided into multiple bins 202 (delineated by white lines in the example of FIG. 2). In the example of FIG. 2, the height of each bin 202 is determined by the number of data records in the corresponding value range of attribute T2 while the width of each bin corresponds to a number of data records in the corresponding value range of attribute T1. For example, bin 202A corresponds to a T1 value range of 25-28°, and a T2 value range of 26-30°. Any data record having first and second attributes in respective T1 and T2 ranges for bin 202A is represented as a cell that is placed in the bin 202A. Placement of the cell in the bin 202A is dependent upon the values of the T1 and T2 attributes (the values of the T1 and T2 attributes define a coordinate of the cell in the respective bin). As data records are received, some data records will have the same T1 and T2 values, which means that the cells for such data records having the same T1 and T2 values would tend to occupy the same position in the visualization screen 200. To avoid overlay of such cells which can cause occlusion of data records as shown in FIG. 1, the visualization technique or mechanism according to some embodiments places cells representing data records having the same pair of T1 and T2 values in nearby locations according to similarity of T3 values. Placing cells in "nearby" locations within the visualization screen 200 refers to placing the cells in such close proximity that a user can detect the clustering of the visual indicators (e.g., colors) of the cells. For example, the cells placed in nearby locations in the visualization screen 200 can be within ones, tens or hundreds of cells of each other.

By placing cells having the same T1 and T2 attribute values and similar T3 values close to each other, clusters of such cells are formed. Interesting clusters in the visualization screen 200 are identified as cluster 204, cluster 206, and cluster 208. The cluster 204 crosses two bins 202A and 202B. The cluster 206 is located in bin 202B, and the cluster 208 crosses bins 202C, 202D, and 202E. The clusters 204 and 206 contain cells assigned a yellow and green colors located in regions of cells of an orange color. According to a color scale 210 for the T3 attribute, the orange color indicates a higher T3 value than the yellow and green colors. Thus, what clusters 204 and 206 depict are yellow-colored and green-colored cells within orange-colored cells, which means that there may be anomalies (e.g., temperature out of sequence or T3<T1 and T2) associated with the data records represented by the cells in the clusters 204 and 206. Similarly, the cluster 208 contains cells having yellow and orange colors within other cells having a darker orange or a red color, which may also indicate that the data records in the cluster 208 may also be associated with anomalies.

For example, a normal temperature sequence may be T1<T2<T3, which means that the T1 sensors should output temperatures less than the T2 sensors, which in turn should output temperatures less than the T3 sensors. The lighter-colored cells within each cluster 204, 206, 208 within regions of darker-colored cells indicate that the normal temperature sequence of T1<T2<T3 is no longer present, such that there can be problems indicated by the data records in the cells contained in cluster 204, 206, or 208. The cells contained in cluster 204, 206, or 208 indicate that the temperatures of a T3 sensor are lower than the temperatures of the T1 sensor and/or T2 sensor.

Figure 3:
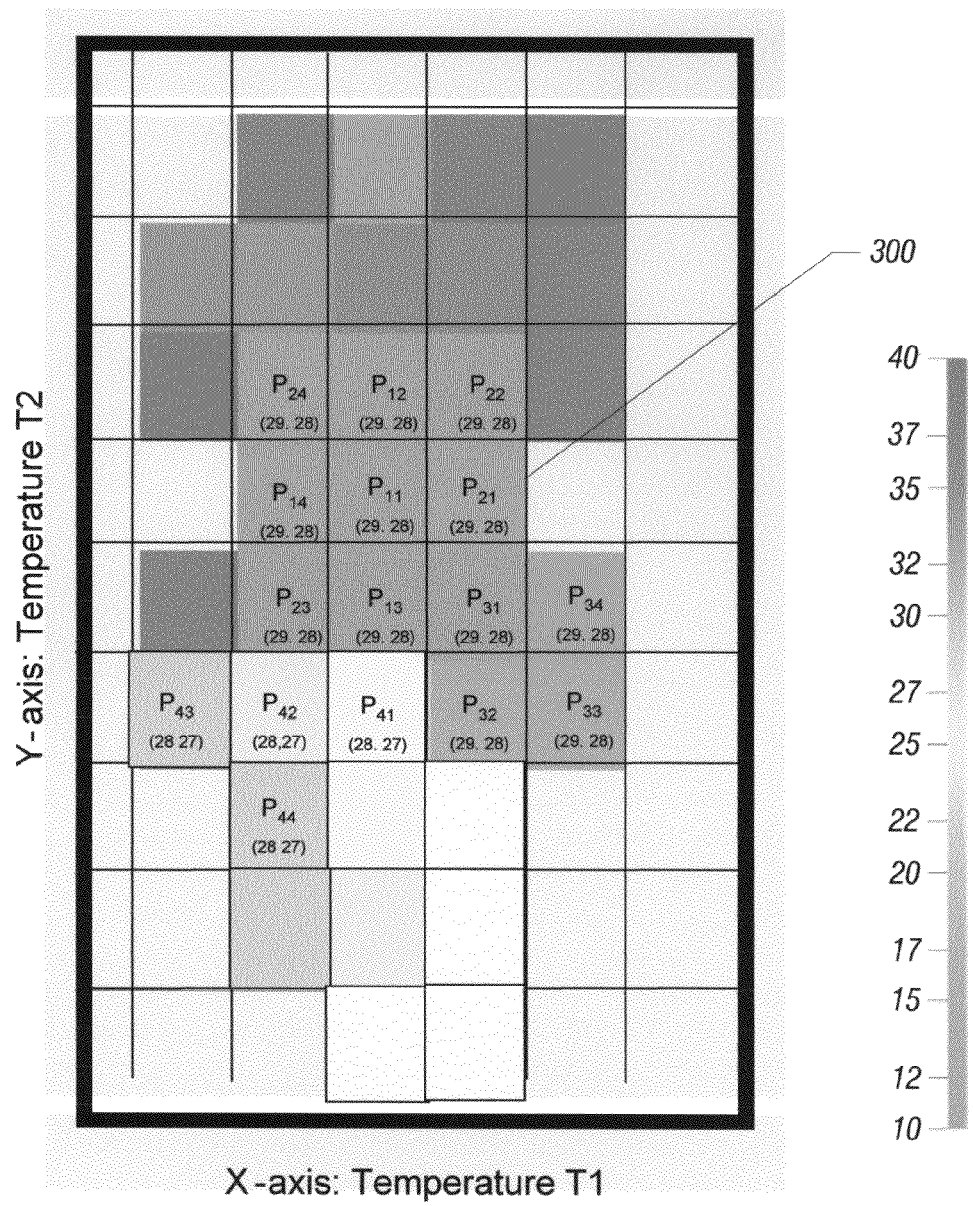
FIG. 3 illustrates sequential insertion of a group of cells corresponding to data records, in which the cells are inserted in different steps and positioned according to an embodiment.

FIG. 3 shows placement of cells corresponding to data records that have the same particular pair of T1 and T2 attribute values (T1=29, T2=28). It is assumed that twelve data record $P_{11}, P_{12}, P_{13}, P_{14}, P_{21}, P_{22}, P_{23}, P_{24}, P_{31}, P_{32}, P_{34}$, and $P_{35}$ have been received that have the same T1 and T2 values. These twelve data records are first sorted by the color attribute value (e.g., T3 value). In one embodiment, the data record from among these twelve data records is selected for placement first. In one example, it is assumed that this data record is $P_{11}$. $P_{11}$ is thus positioned according to the T1 and T2 attribute values of 29 and 28, respectively. The placement of the cells associated with data records have the same T1 and T2 values are based on similarity of T3 values. The cells corresponding to eight other data records ($P_{12}, P_{13}, P_{14}, P_{21}, P_{22}, P_{23}, P_{24}, P_{31}$) having the same or most similar colors as the data record $P_{11}$ are positioned in the eight locations immediately adjacent the cell for data record $P_{11}$ to form a rectangle 300 (or other structure of a different shape), such as in an order of top to bottom, left to right, diagonal direction, or any other direction. The tenth data record in the sorted order is assumed to be $P_{32}$, which is positioned in the right, lower corner of the rectangle 300 close to another data record $P_{41}$ that has already been placed. The data record $P_{32}$ is placed at the right, lower corner of the rectangle near data record $P_{41}$ because: (1) $P_{41}$ has a more similar color to the cells in the rectangle 300 (as compared to the red or orange cells on the other side of the rectangle 300); and (2) $P_{41}$ has the most number of neighborhood cells ($P_{42}, P_{43}, P_{44}$) as compared to other cells around the rectangle 300 containing green cells. The other data records $P_{33}$ and $P_{34}$ (that have the same T1 and T2 attribute values) are also positioned near the right, lower corner of the rectangle 300. The above placement algorithm is repeated for other incoming data records to form other clusters.

Figure 4:
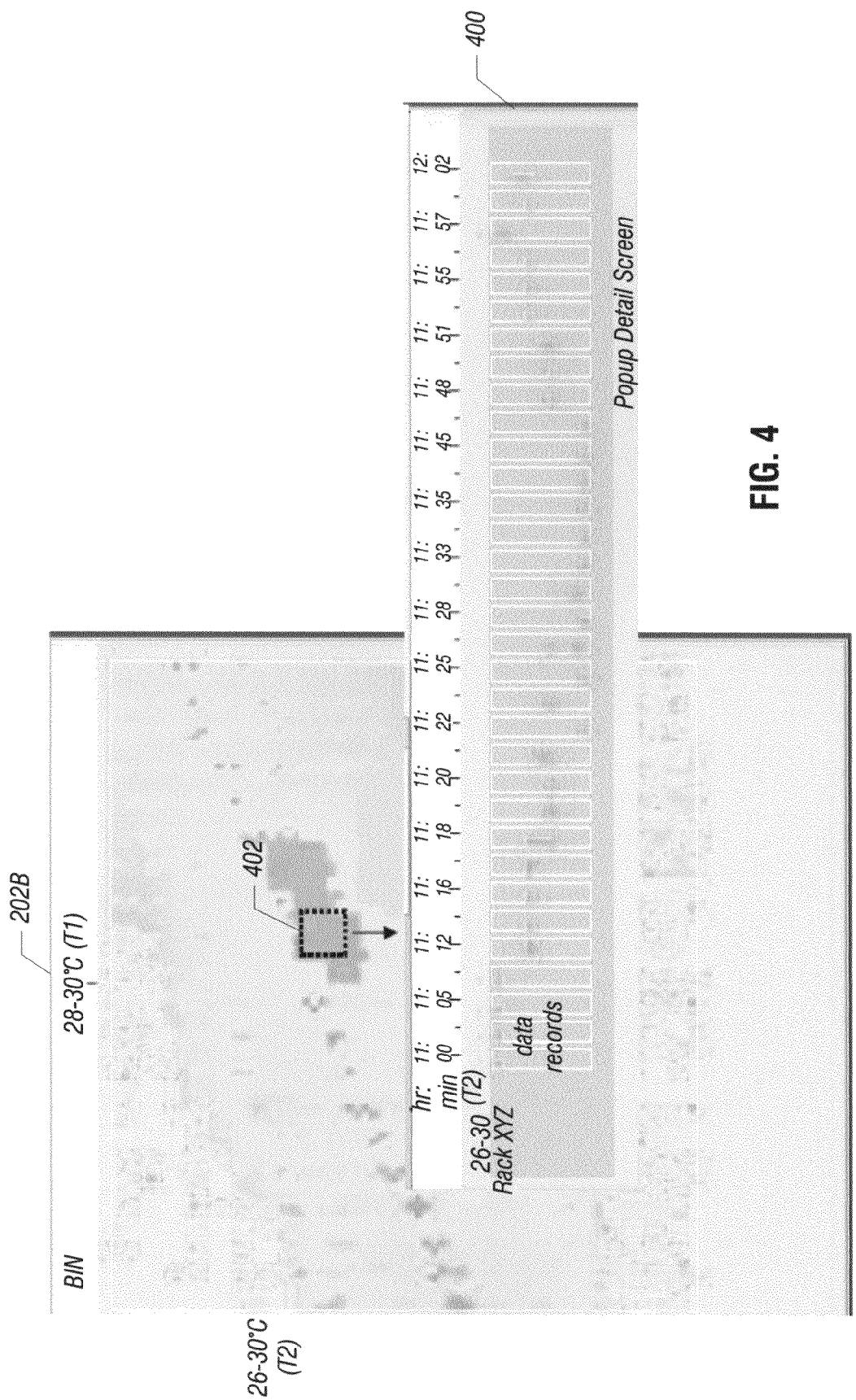
FIG. 4 illustrates selection of a portion of the visualization screen of FIG. 2 for more detailed visualization of data records within the selected portion, where the detailed visualization uses specified attributes (such as time, rack name, and temperature), in accordance with an embodiment.

The visualization screens presented according to some embodiments are also interactive screens that allow a user to select different parts of the screens to view further details regarding those parts. FIG. 4 shows an example of user interaction with the bin 202B that is shown in the visualization screen 200 of FIG. 2. A user can use a user input device (such as a mouse) to select a region 402 in the bin 202B (such as to query for detailed information in a rubber-banded area). The selection of the region 402 can be accomplished by using a click and drag action, for example, which causes a popup detail screen 400 to be displayed. The popup detail screen 400 shows data records at different time points (which are represented by the horizontal dimension of the popup detail screen 400) for a particular rack (Rack XYZ) in the example system mentioned above. The data records contained in the popup detail screen 400 have T2 attribute values in the range 26-30°, in the example shown in FIG. 4. Note that the content of the popup detail screen 400 can be based on a query submitted by a user from the rubber-banded area for a particular time interval and for a particular rack identifier (in this case Rack XYZ).

Figure 5:
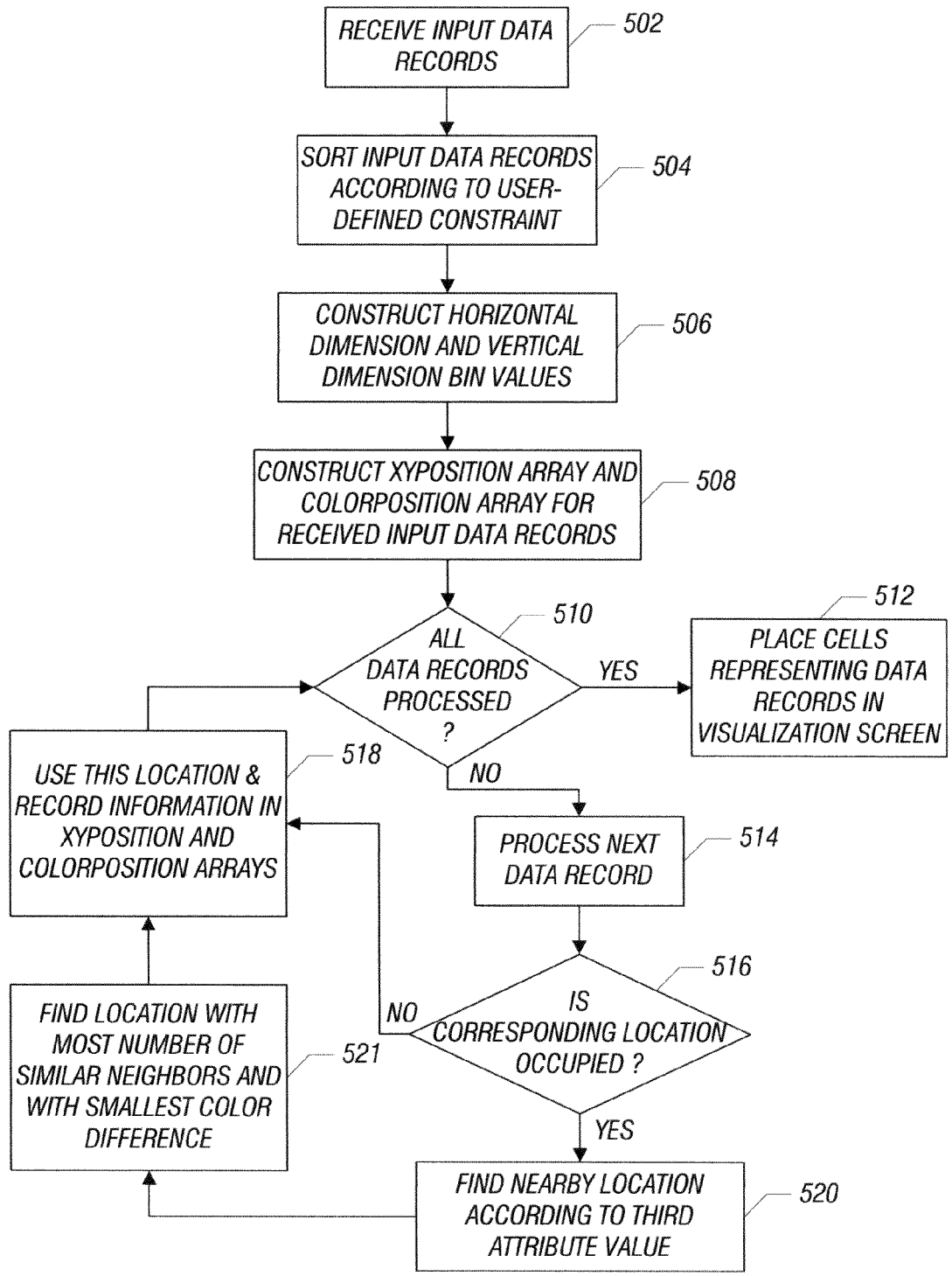
FIG. 5 is a flow diagram of a process of visualizing data records of a scatter plot, according to an embodiment.

FIG. 5 illustrates a procedure performed by visualization software according to an embodiment. Input data records are received (at 502). The received input data records can be data records received over a network in real time, or alternatively, the input data records can be retrieved from a storage location, such as a database or log. The visualization process receives input data records in "real-time" if the visualization process updates the visualization of the data records as new data records are received.

The received input data records are sorted (at 504) according to a user-defined constraint, which can be the third attribute value (T3 attribute). "Sorting" refers to sorting the data records according to values of the selected attribute (in increasing or decreasing order, for example). Incrementing sorting can be repeatedly performed as additional data records are received, such as when data records are received in real time.

By sorting the input data stream in either ascending or descending order based on the user-defined constraint, clustering of the received data records is made more efficient. For example, the data stream can be sorted in an ascending order according to a temperature constraint, which in the case of FIG. 2 is the T3 temperature constraint (to allow a user to find low T3 temperatures that appear in high T1 and T2 temperature bins).

Next, the horizontal dimension and vertical dimension bin values are constructed (at 506), which refers to determining the value ranges of T1 and T2 that define the bin widths and heights for the visualization screen. The visualization screen 200 of FIG. 2 shows some examples of T1 value ranges and T2 value ranges that define respective bins 202, 202A, 202B, 202C, 202D, 202E.

Next, an XYPosition array is constructed (at 508), where the XYPosition array corresponds to all possible X and Y positions in the visualization screen (e.g., 200 in FIG. 2) according to the received input data records. The data records are positioned in the XYPosition array according to the values of the first and second attributes. Each data record is to be placed in the visualization screen. In one example, the x-axis represents the value of the first attribute T1 and the y-axis represents the second attribute T2. The color of a data record is indicated by the value of a third attribute, T3, where the color ranges from low (green), medium (yellow and orange), to high (red).

A data record, p(X,Y, color) is now represented by a cell, which is placed inside the corresponding temperature bin. A bin is defined as the number of data records having the (X,Y) coordinates within certain X and Y value ranges. The binning of the x- and y-axes and the size of a bin are determined automatically according to the number of the data records within the value ranges. For example, a data record $P_{11}$ with (X,Y, color)=(29° C., 28° C., 15° C.) is positioned within the bin (28-30° C., 26-30° C.), as shown in FIG. 2. Other data records that have the same X,Y values as $P_{11}$ are placed according to the algorithm of FIG. 3.

In task 508, a ColorPosition array is also constructed for the received input data records, where the ColorPosition array groups data records that have the same first and second attribute values in close proximity to each other based on similarity of values of the third attribute.

The visualization software next determines (at 510) if all data records have been processed. If so, then the cells representing the data records are placed (at 512) in the visualization screen, such as visualization screen 200 in FIG. 2.

If not all data records have been processed, the next data record is processed (at 514). The first and second attribute values for the next data record is determined, and based on the determined first and second attribute values, the visualization software determines (at 516) if the corresponding location in the visualization screen is occupied. If not, then this location is used as the location for the data records and the information for this data record is recorded in the XYPosition array and the ColorPosition array. The process then returns to task 510.

However, if the corresponding location is occupied by another cell, then the visualization software finds (at 520) a nearby location (near the already-occupied cell), with the proximity based on the third attribute value. If there are several possible equidistant positions, such as depicted in FIG. 3 where several corners of the rectangle 300 are available to position cells representing data records having the same first and second attribute values), then the location selected (at 521) is the location with the most number of similar neighbors and with the smallest color difference. Control then proceeds to task 518 to update the XYPosition and ColorPosition arrays.

The placement algorithm for this technique uses the size of the bin (width×height) and the empty spaces around the already occupied data records to compute the best location for the data record that would be overlaid in a traditional scatter plot. Data records $P_{12}$ to $P_{31}$ with the same (X,Y) coordinates will be placed in a neighborhood around the already plotted data point $P_{11}$ according to the similarity of their colors. These points are sorted by the value of the third attribute (e.g., T3) and are placed close together in the order shown in FIG. 3 to form clusters. After the eight data records are placed in FIG. 3 around $P_{11}$, the $10^{th}$ data record $P_{32}$ will be placed by selecting a location which has the most number of the data records which have similar values as shown in the bottom right corner in FIG. 3. This technique reveals interesting distributions and patterns which otherwise would have been lost.

Figure 6:
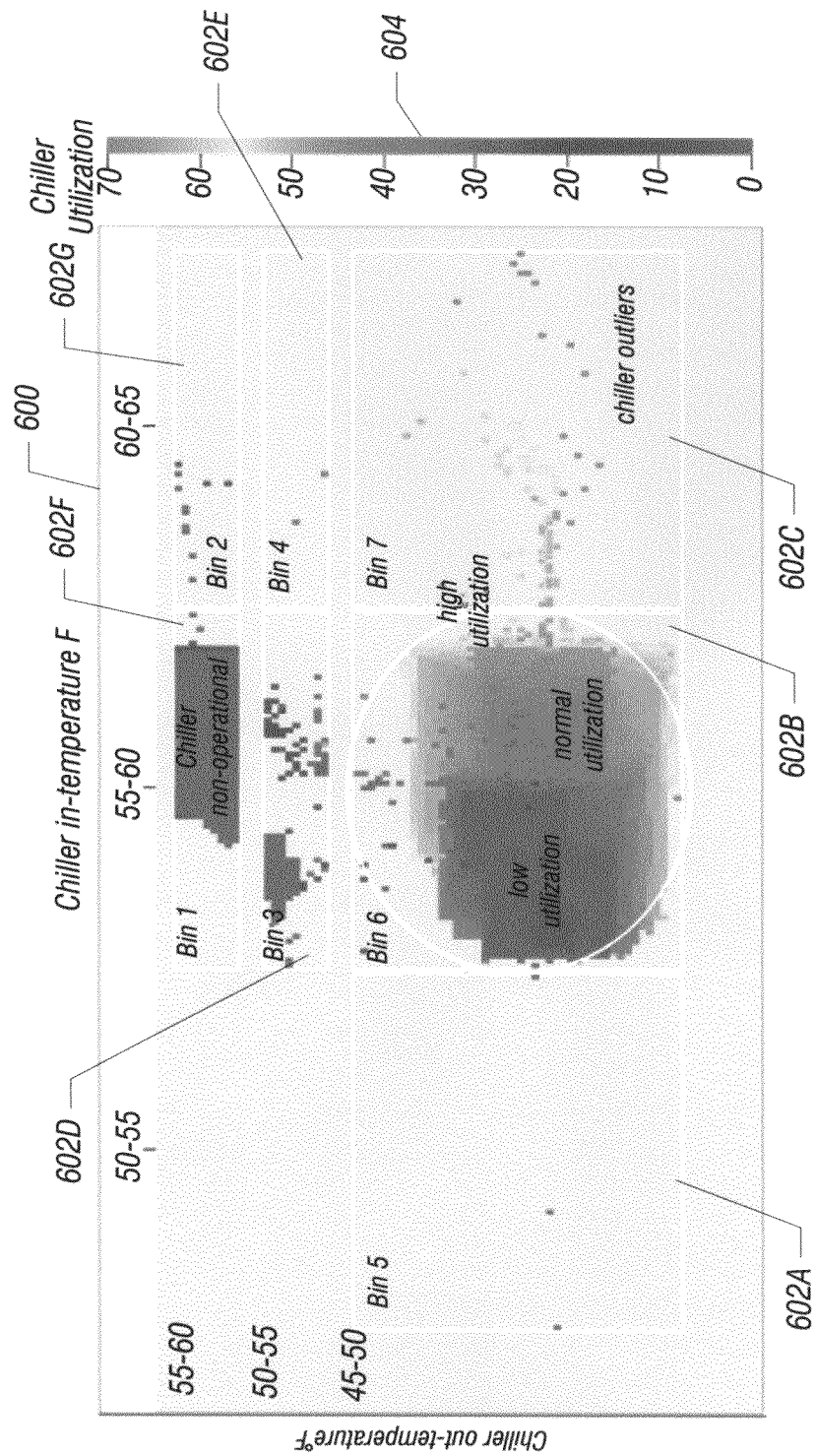
FIGS. 6 and 7 illustrate other visualization screens that have bins containing clusters of cells representing respective data records of a scatter plot, in accordance with other embodiments.

FIG. 6 shows another example visualization screen 600 that includes bins 602A-602G corresponding to value ranges for a first attribute (Chiller In-temperature) along the horizontal dimension and a second attribute (Chiller Out-temperature) along the vertical dimension. A "chiller" in this example refers to cooling equipment used to extract heat from warm fluid to provide cold fluid to an air-conditioning unit for cooling electronic devices, for example. The Chiller In-temperature refers to the temperature at the input (warm fluid) of the chiller, while the Chiller Out-temperature refers to the temperature at the output (cold fluid) of the chiller.

Cells are placed in corresponding bins 602A-602G according to coordinates specified by the Chiller In-temperature and Chiller Out-temperature attribute values. In addition, a third attribute used for assigning colors to the cells is a Chiller Utilization attribute, which is a percentage value indicating what percentage of the capacity of the chiller is utilized.

In the example of FIG. 6, bin 1 (602F) contains a cluster of purple cells that indicate zero or close to zero utilization of the chiller, which is an indication that the chiller is non-operational. As another example, in bin 6 (602B), there are clusters of cells associated with low chiller utilization (purple or blue colors), normal utilization (green colors), and high utilization (yellow and orange colors). Bin 7 (602C) depicts cells representing outliner data records, which indicate that the combinations of Chiller In-temperature and Chiller Out-temperature in bin 7 is uncommon or relatively rare. Bins 2 and 4 (602G and 602E) show a few data records corresponding to high chiller in-temperatures and out-temperatures.

Based on the depicted visualization screen 600, a user can determine how chiller performance can be improved, determine how the chiller is operating (non-operational, low utilization, normal utilization, or high utilization), and determine usage patterns of the chiller (for a data center). For example, the visualization screen 600 would inform the data center that the chiller is most active in bin 6. If desired, the data center can save energy costs by reducing chiller activity in scenarios that correspond to bins other than bin 6.

Figure 7:
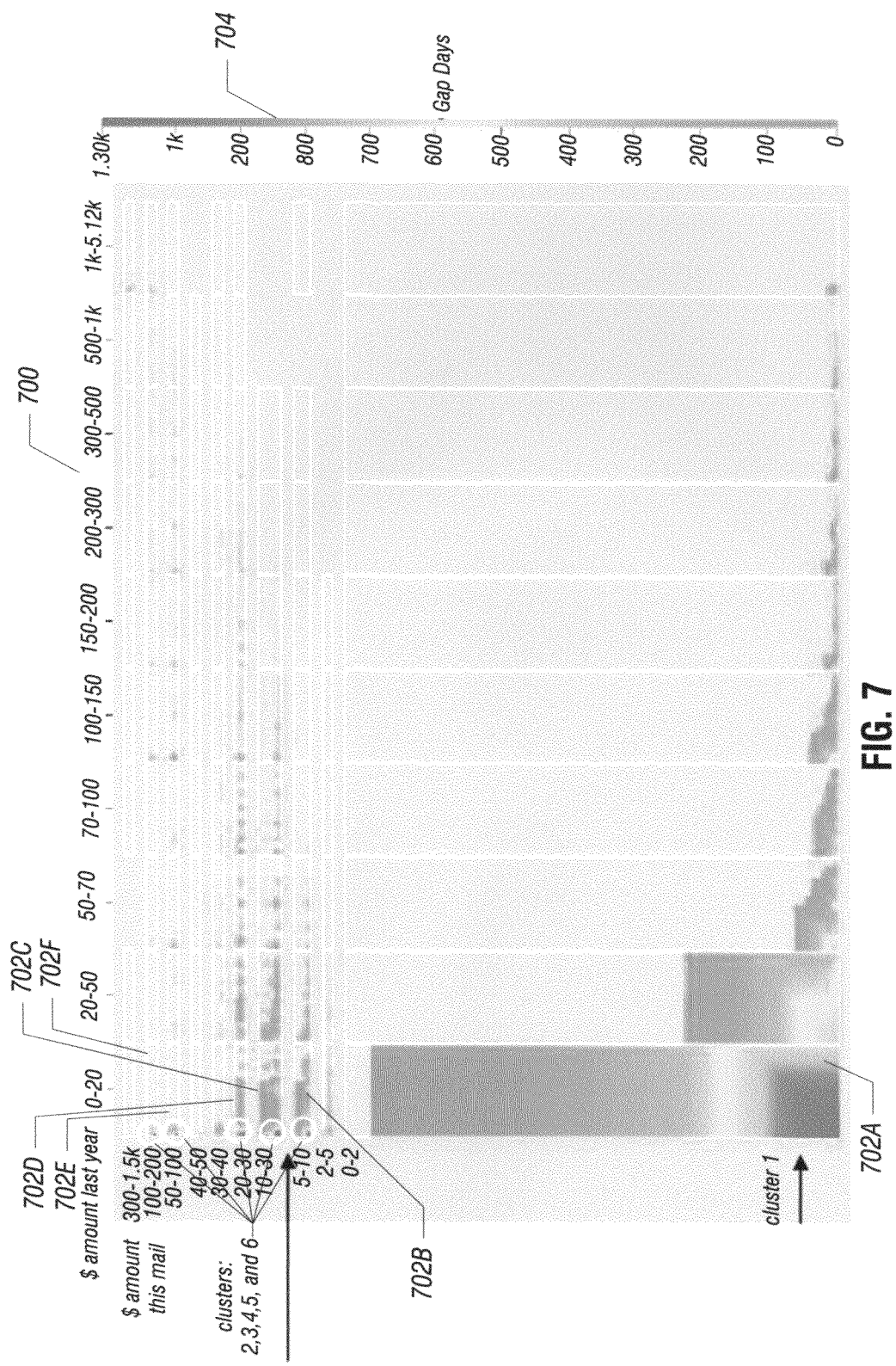

FIG. 7 shows another example visualization screen 700 that contains cells represent data records for donors to a charitable organization. The horizontal dimension represents the attribute $ Amount Last Year (amounts donated by the donors last year), and the vertical dimension represents the attribute $ Amount This Mail (amounts sought to be donated by the donors to the next mail campaign from the charitable organization). These attribute values are separated into multiple value ranges to define the bins depicted in the visualization screen 700, including bins 702A-702F. The color of each cell represents the number of days since the donor made a donation (gap days attribute).

A donor that has not donated for an extended period of time (e.g., gap days >1,000) is unlikely to donate again. The visualization screen 700 shows clusters of cells representing donors who have not donated for an extended period of time (clusters of red cells in bins 702A-702F).

The visualization screen 700 can help answer two common questions when charity organizations are planning their donation campaigns: "Who will donate?"; and "How much will they donate?"

FIG. 8 shows an example computer 804 in which visualization software 800 is executable, in accordance with some embodiments. The visualization software 800 is able to perform the various tasks described above. The visualization software 800 is executed on one or more central processing units (CPUs) 802, which is connected to a storage 810. The storage 810 stores a database 812 that can contain input data records to be processed by the visualization software 800. Alternatively, the input data records can be received in real-time over a network interface.

The computer 804 also includes a display device 806 in which visualization screen 808 (such as the visualization screens depicted in FIGS. 2, 6, and 7) can be presented.

Instructions of the visualization software 800 are loaded for execution on a processor (such as the one or more CPUs 802). The processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer to construct at least one cell-based cluster of data records of a scatter plot, comprising:
    placing cells representing the data records in a visualization screen according to values of a first attribute and a second attribute of the data records;
    assigning visual indicators to the cells according to values of a third attribute of the data records; and
    wherein placing the cells comprises:
    in response to detecting data records having a particular pair of first attribute and second attribute values, placing a group of cells representing the data records having the particular pair of first attribute and second attribute values in nearby positions according to similarity of values of the third attribute to form the at least one cluster of cells having similar visual indicators, wherein placing the cells of the group in the nearby positions avoids overlay of the cells of the group.

2. The method of claim 1, wherein placing the cells representing the data records having the particular pair of first attribute and second attribute values is further based on another criterion that relates to placing cells in locations nearby another neighborhood of cells.

3. The method of claim 1, wherein forming the at least one cluster of cells comprises forming a first cluster of cells representing the data records having a first pair of first and second attribute values, wherein placing the cells further comprises:
    in response to detecting data records having a second pair of first and second attribute values, placing cells representing the data records having the second pair of first and second attribute values in nearby positions according to similarity of values of the third attribute to form a second cluster of cells having similar visual indicators.

4. The method of claim 1, wherein assigning the visual indicators to the cells comprises assigning colors to the cells according to the values of the third attribute, wherein the third attribute is different from the first and second attribute.

5. The method of claim 4, wherein forming the at least one cluster comprises forming a cluster of cells having similar color.

6. The method of claim 1, wherein placing the cells representing the data records having the particular pair of first and second attribute values in nearby positions according to similarity of the values of the third attribute comprises placing cells having more similar values of the third attribute closer together in either ascending or descending order, wherein the third attribute is different from the first and second attributes.

7. The method of claim 6, wherein placing the cells representing the data records having the particular pair of first and second attribute values in nearby positions according to similarity of the values of the third attribute further comprises selecting positions for a remainder of the cells the data records having the particular pair of first and second attribute values according to one or more of the following criteria: locations with a most number of cells having the particular pair of the first and second attribute values, and locations having cells with a smallest third attribute difference.

8. The method of claim 1, further comprising sorting the data records prior to placing the cells in the visualization screen.

9. The method of claim 8, wherein sorting the data records comprises sorting the data records according to values of the third attribute, wherein the third attribute is different from the first and second attributes.

10. The method of claim 1, further comprising:
receiving user interaction in the visualization screen; and
in response to the received user interaction, displaying another screen showing more detailed information regarding a portion of the data records visualized by the visualization screen.

11. A method executed by a computer to visualize clustering of data records of a scatter plot, comprising:
based on values of first and second attributes of the data records, define an array of bins in a visualization screen;
placing cells representing the data records into respective bins, wherein placing each of the cells into a corresponding one of the bins is according to a coordinate defined by the values of the first and second attributes;
assigning visual indicators to the cells according to values of a third attribute of the data records, where the third attribute is different from the first and second attributes; and within each of the bins, clustering cells according to similarity of values of the third attribute to form one or more clusters of cells, wherein the clustering comprises:
in response to detecting cells sharing a common pair of first and second attribute values, positioning the cells sharing the common pair of first and second attribute values in nearby locations instead of to avoid overlaying the cells sharing the common pair of first and second attribute values at a common location.

12. The method of claim 11, wherein assigning the visual indicators comprises assigning colors, and wherein clustering the cells according to the similarity of the values of the third attribute forms one or more clusters of similarly colored cells.

13. An article comprising at least one non-transitory computer-readable storage medium containing instructions that when executed cause a computer to:
place cells representing the data records in a visualization screen according to values of a first attribute and a second attribute of the data records;
assign visual indicators to the cells according to values of a third attribute of the data records, wherein the third attribute is different from each of the first and second attributes; and
wherein placing the cells comprises:
in response to detecting data records sharing a common pair of a first attribute value and a second attribute value, place cells representing the data records sharing the common pair of the first attribute value and the second attribute value in nearby positions according to similarity of values of the third attribute to form a cluster of cells having similar visual indicators, wherein placing the cells of the cluster in the nearby positions avoids overlaying of the cells in the cluster.

14. The article of claim 13, wherein assigning the visual indicators to the cells according to the values of the third attribute comprises assigning colors to the cells according to the values of the third attribute, and wherein forming the cluster of cells comprises forming the cluster of similarly-colored cells.

15. The method of claim 1, further comprising:
receiving a further data record that has the particular pair of the first attribute value and the second attribute value;
determining that a position in the virtualization screen corresponding to the particular pair of the first attribute value and the second attribute value is already occupied by one of the cells in the cluster; and
in response to the determining, identifying a position nearby the already-occupied position to place a cell representing the further data record.

16. The method of claim 11, further comprising:
receiving a further data record that shares the common pair of the first attribute value and the second attribute value;
determining that the common location in the visualization screen corresponding to the common pair of the first attribute value and the second attribute value is already occupied by one of the cells already placed in the visualization screen; and
in response to the determining, identifying a location nearby the common location to place a cell representing the further data record.

17. The article of claim 13, wherein the instructions when executed cause the computer to further:
receive a further data record that shares the common pair of the first attribute value and the second attribute value;
determining that a position in the visualization screen corresponding to the common pair of the first attribute value and the second attribute value is already occupied by one of the cells in the cluster; and
in response to the determining, identify an unoccupied position nearby the already-occupied position to place a cell representing the further data record.

* * * * *

UNITED STATES PATENT AND TRADEMARK OFFICE
CERTIFICATE OF CORRECTION

PATENT NO. : 8,643,646 B2  Page 1 of 1
APPLICATION NO. : 12/381716
DATED : February 4, 2014
INVENTOR(S) : Ming C. Hao et al.

It is certified that error appears in the above-identified patent and that said Letters Patent is hereby corrected as shown below:

In the Claims:

In column 9, line 24, in Claim 11, after "locations" delete "instead of".

Signed and Sealed this
Twentieth Day of May, 2014

Michelle K. Lee
*Deputy Director of the United States Patent and Trademark Office*